United States Patent
Im

(10) Patent No.: US 8,155,499 B2
(45) Date of Patent: Apr. 10, 2012

(54) SCREEN SAVING METHOD OF IMAGE APPARATUS

(75) Inventor: Jong Guk Im, Seoul (KR)

(73) Assignee: LG Electronics Inc., Seoul (KR)

(*) Notice: Subject to any disclaimer, the term of this patent is extended or adjusted under 35 U.S.C. 154(b) by 1441 days.

(21) Appl. No.: 11/482,826

(22) Filed: Jul. 10, 2006

(65) Prior Publication Data
US 2007/0014541 A1  Jan. 18, 2007

(30) Foreign Application Priority Data
Jul. 13, 2005  (KR) .................. 10-2005-0063307

(51) Int. Cl.
*H04N 5/775* (2006.01)

(52) U.S. Cl. ........ 386/230; 386/241; 386/248; 386/353; 715/85; 345/158; 348/634

(58) Field of Classification Search .............. 386/96, 386/230, 241, 248, 353; 715/85; 345/158; 348/634
See application file for complete search history.

(56) References Cited

U.S. PATENT DOCUMENTS

| 6,288,715 B1* | 9/2001 | Bain et al. ...... 345/211 |
| 2002/0171770 A1* | 11/2002 | Wendt et al. ...... 348/634 |
| 2005/0183017 A1* | 8/2005 | Cain ...... 715/719 |

FOREIGN PATENT DOCUMENTS
KR  10-2003-0094483 A  12/2003

OTHER PUBLICATIONS

WAScreensaver-system screen saver, Shows track/playlist info. M. Zenkel, Jan. 2003 Retrieved from: http://www.winamp.com/plugin/wascreensaver/126488.*

* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP

(57) ABSTRACT

A screen saving method of an image apparatus is provided. The screen saving method includes playing back an audio signal, and displaying a screen saving image that includes audio playback data, according to the played back audio signal. The image apparatus includes a media playback unit, a display unit, and a control unit. The media playback unit plays back the audio signal. The display unit displays the audio playback data. The control unit controls the displaying of the screen saving image, and varies the position of the screen saving image over time.

12 Claims, 3 Drawing Sheets

SCREEN SAVING METHOD OF IMAGE APPARATUS

BACKGROUND OF THE INVENTION

1. Field of the Invention

The present invention relates to an image apparatus, and more particularly, to a method of preventing damage to a screen caused by overheating during prolonged music playback and to an image apparatus using said method.

2. Description of the Related Art

The trend for modern image apparatuses is for high integration and multi-function capability that can play back recorded material, photographs, music, etc. This trend is particularly applicable to digital TVs and set top boxes coupled to personal video recorders (PVR) and digital TVs and set top boxes with memory card slots.

Digital TVs and set top boxes with built-in memory slots or equipment with digital versatile disc (DVD) trays allow users to play back music on MP3 files or audio compact discs (CDs).

However, in order to listen to music and play back a list of songs, the visual data that is shown on a display is limited to the title of a song, its playback time, etc.

That is, during music playback, an image apparatus displays a fixed amount of data on a still screen. When music is played back with a continuously unchanging screen on a CRT, PDP, or LCD device, the image apparatus overheats after an extended period of time elapses. With prolonged music playback, the degree of overheating becomes severe. When such an overheated image apparatus is employed to display a television program or DVD movie after the playing back of music, an afterimage on the overheated device may remain.

Generally, when playing back music on an image apparatus, a user first inserts a CD, memory card, or other medium (on which the music is stored) into the image apparatus. The image apparatus in which the music has been inserted then displays a list of music for playback. This list includes song titles, track numbers, etc., from which the user selects desired songs for playback. Here, the image apparatus remains for the most part in an unaltered state for the duration of music playback, with only the playback times and song information changing.

When music is played back on an image apparatus over a prolonged period without changing the entire layout of the displayed screen, the fluorescent material in the CRT, PDP, or LCD device connected to the video apparatus can be damaged, so that the damaged portion can no longer emit light. Alternately, after the list of songs on the screen is turned off for another application (such as viewing television), a ghost image of the song list can remain on the display.

To save a screen, a user may turn it off during music playback. In this case, however, not only is a user unable to obtain information on the songs being played back, but also the screen cannot be visually appreciated.

SUMMARY OF THE INVENTION

Accordingly, the present invention is directed to a screen saving method and an image apparatus using the same that substantially obviates one or more problems due to limitations and disadvantages of the related art.

An object of the present invention is to provide a screen saving method capable of preventing a screen from being damaged during extended playback of music while displaying information on the current song being played back to a user, and an image apparatus using said method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a screen saving method of an image apparatus, including: playing back an audio signal; and displaying a screen saving image including audio playback data, according to playing back of the audio signal.

In another aspect of the present invention, there is provided a screen saving method of an image apparatus, including: playing back an audio signal; and varying a position of and displaying an image including audio playback data over time, according to the playing back of the audio signal.

In a further aspect of the present invention, there is provided an image apparatus including: a media playback unit for playing back an audio signal; a display unit for displaying an image including audio playback data that allows a user to select an audio signal for playback; and a control unit for controlling a varying of a position of and the displaying of the image over time according to the audio signal played back by the media playback unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
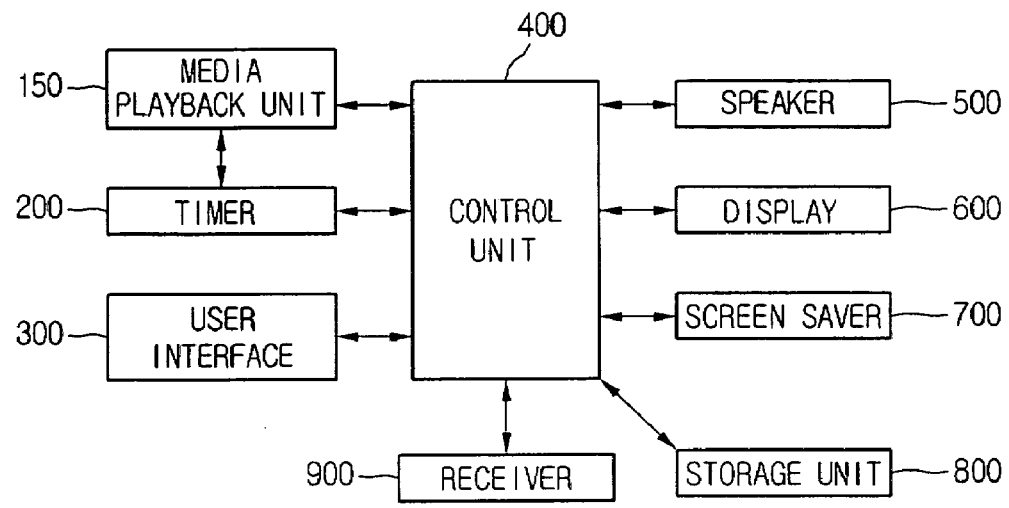
FIG. 1 is a schematic block diagram showing the components of an image apparatus employing a screen saving method according to the present invention.

FIG. 1 is a schematic block diagram showing the components of an image apparatus employing a screen saving method according to the present invention. Referring to FIG. 1, the image apparatus includes a user interface 300 for enabling a user to input commands using command keys, a media playback unit 100 for playing back music or video media specified by the user through the user interface 300, a timer 200 for activating the screen saver when the media playback unit 100 operates, a speaker 500 for outputting the music played back through the media playback unit 100, a display 600 for operating in a screen saver mode during the media playback, and a screen saver 700 for allowing the display 600 to operate in the screen saver mode, a storage unit 800 with a main memory and a hard disk drive (HDD) for storing data, and a receiver 900 for receiving and processing outside broadcast data.

The image apparatus having the above construction accesses a list of songs according to a user's command when a user inserts a medium (CD, memory card, etc.) containing desired music in the media playback unit 100.

Then, the user selects the music from the list. When the selected music is played back, the control unit 400 activates the timer 200. The timer 200 determines when to activate the screen saver 700, and is reset by the control unit 400 when the user presses the control buttons during music playback. When a preset time for the timer 200 to activate the screen saver 700 elapses, the song list displayed by the display 600 is erased and the screen saver mode is activated.

When the screen saver mode is activated and appears on the display 600, the control unit 400 resets and reactivates the timer 200. Here, the timer 200 checks the time in order to renew the screen saving screen.

Subsequently, when a preset time elapses, the timer 200 renews the screen saver. If the user presses a control key, the screen saver is terminated, and the list of songs is re-displayed. If the music from the list continues to be played back, the timer is activated again in order to check the time for activating the screen saver 700.

Figure 2:
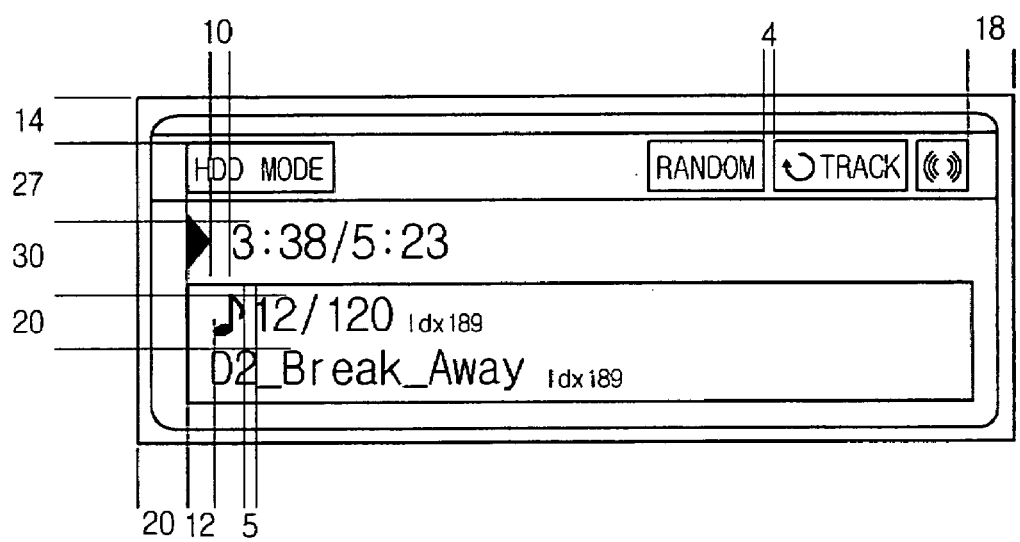
FIG. 2 is a diagram showing a screen saver mode displayed on a screen of the image apparatus in FIG. 1.

FIG. 2 is a diagram showing a screen saver mode of the display 600, provided by the screen saver 700 of the image apparatus of FIG. 1.

First, as shown in FIG. 2, the data displayed in the screen saver mode includes a device for playing back the music (i.e., an HDD, memory card, CD/DVD), the total playback time of the song being played and its current time played back, the playback mode (i.e., a sequential playback, a random playback, a loop track, and a loop entire list), the sound mode (i.e., stereo, left mono, right mono), the total number of songs, the number of the current song of the total number of songs (i.e., 12/120), and the title of the current song.

An example of using the screen saver is to black out the entire screen to protect the entire screen, as in FIG. 2. Because the music continues to be played back, the current time of playback continues to change during the screen saving mode.

During the operation of the screen saver, the timer re-activates the screen saving mode when a preset time elapses.

Methods of re-activating the screen saver mode includes a method of randomly changing the position of an image on the screen and a method of creating a soft, imaginary line on-screen and moving the image along that line. That is, an image for the screen saver mode can be a still image unmoving or a moving image for a predetermined reset duration, both of which can be displayed in various ways according to the genre of music being played back.

Also, during operation of the screen saver, when a song ends, necessary information such as the playback time, the current number of the song being played, and other data is all renewed simultaneously.

Figure 3:
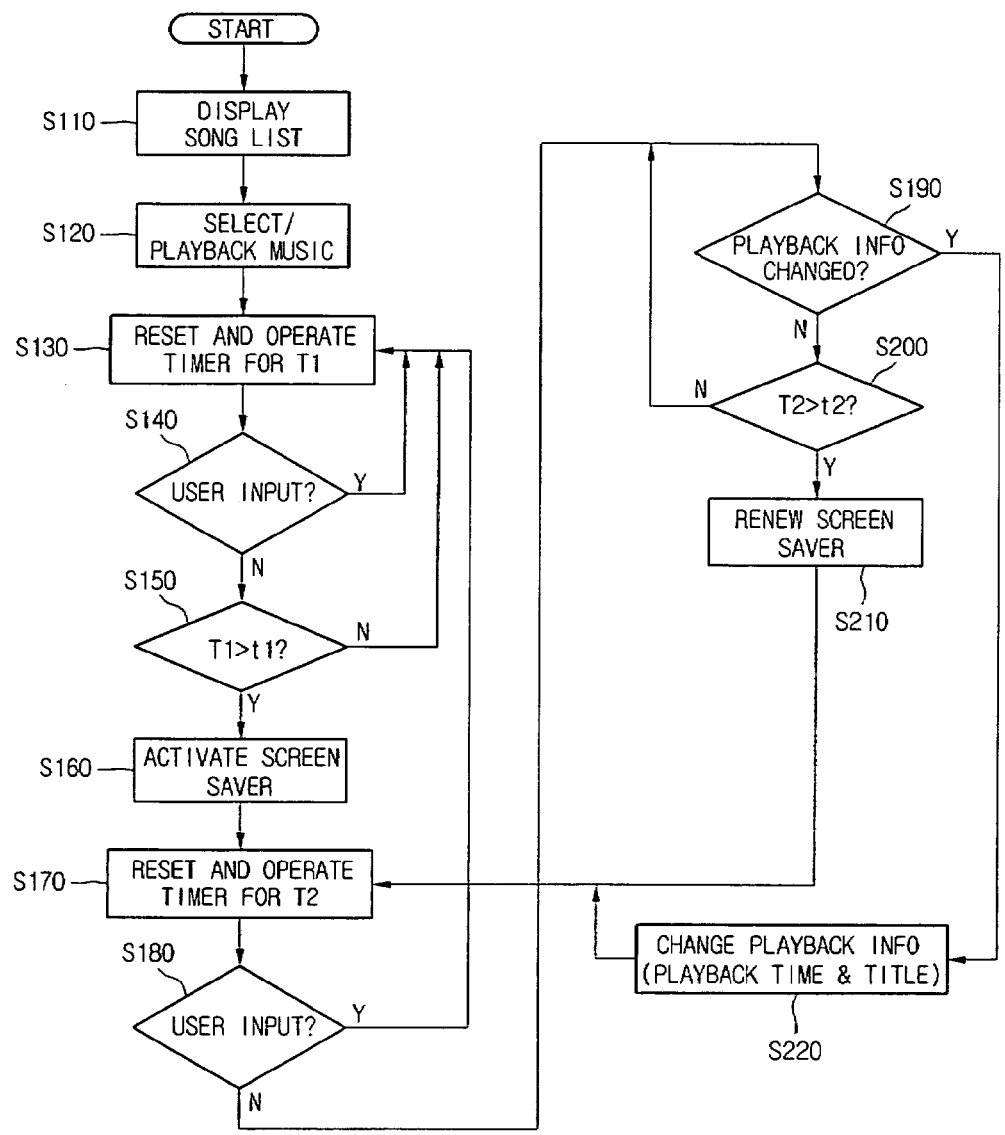
FIG. 3 is a flowchart showing a screen saving method of an image apparatus according to the present invention.

FIG. 3 is a flowchart showing a screen saving method of an image apparatus according to the present invention.

After a user inserts a medium (CD, memory card, etc.) which contains music desired for playback into the media playback unit 150 of the image apparatus, the image apparatus in which the medium has been inserted displays a list of music for playing back in an operation S110. The user then selects music for playback in an operation S120.

Here, the timer is activated for T1 in an operation S130 while the selected music is played back. Here, that music has been played back means that a still image is displayed on the display 600, and the timer begins to measure a predetermined duration from the start of music playback, which is the initializing point at which the still image is displayed. During this measuring of the predetermined duration, it is determined whether there is a user's manipulation (operation S140). Such user's manipulation can include stopping the currently played song to begin another song, or restarting the playback of the current song being played. If there is the user's manipulation as a result of the determination, the timer is reset for T1. If there is no user's manipulation and the activated duration of the timer is greater than a predetermined time t1 that is preset for activating the screen saver, the control unit 400 commands the screen saver 700 to operate in a screen saver mode on the display 600. That is, the screen saver 700 is activated (operations S150-S160).

During the activation of the screen saver 700, the timer is re-activated for a predetermined time T2. T2 is for measuring the time for renewing an image displayed on the display in screen saver mode. Moreover, after activation of the timer for T2, it is determined whether there is a user's manipulation (operation S180). If there is the user's manipulation of selecting a new setting during the currently played music as a result of the determination, the operation S130 is performed again, where the timer is activated for the predetermined duration T1. If there is no user's manipulation, it is determined whether the playback data contained in the medium has changed (operation S190). A change in the playback data includes a case in which the currently playing song is continuously transformed to another song, a change in playback time, etc.

If the playback data contained in the medium has changed as a result of the determination (operation S190), the playback data (playback time, song title, etc.) is changed on the screen (operation S220), and the timer is reset to be activated for the time T2.

If the playback data contained the medium has not changed as a result of the determination (operation S190), it is determined whether the activated time T2 of the timer exceeds a predetermined time that is preset for renewing the position of the screen saver (operation S200).

If the activated time T2 of the timer does not exceed the predetermined time preset for renewing the position of the screen saver as a result of the determination (operation S200), the operation S190 is repeated.

On the other hand, if the activated time T2 of the timer exceeds the predetermined time preset for renewing the position of the screen saver as a result of the determination (operation S200), an image displayed in the screen saver mode is renewed on the display (operation S210), and the timer is reset at the same time to be activated for the time T2 (operation S170).

Through the above processes, the screen saving method according to the present invention can be realized in detail.

Figure 4:
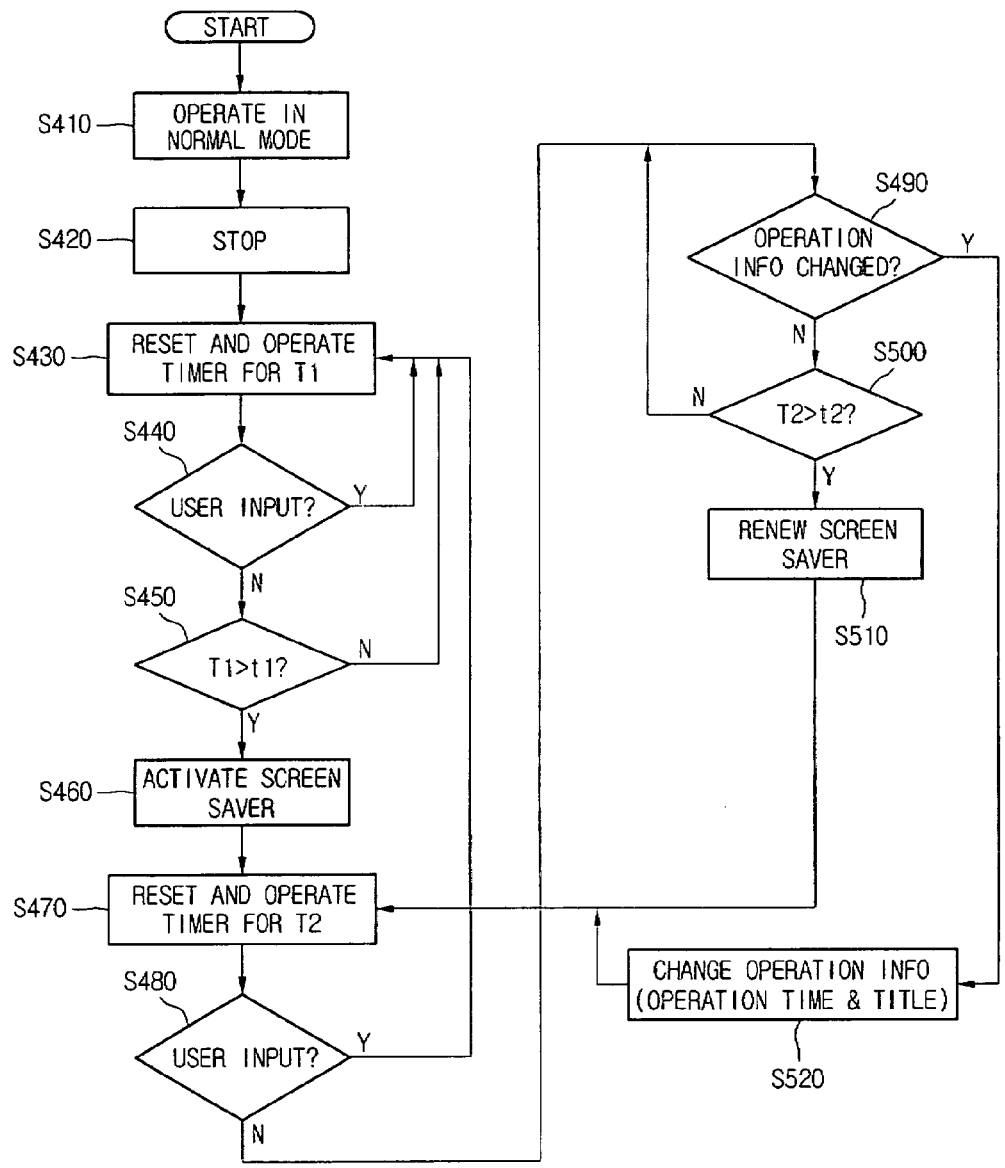
FIG. 4 is a flowchart showing the screen saving method in FIG. 3 under different circumstances.

Although FIG. 4 shows the substantially same method as that of FIG. 3, FIG. 3 shows an exemplary screen saving method with a still image displayed during the playback of music, and FIG. 4 shows an example of operating when a general still image is displayed. The principle of the screen saving methods in the two diagrams is the same.

Descriptions have been for a method and apparatus according to preferred embodiments of the present invention; however, these descriptions are for illustrative purposes only, so that the present invention is not limited thereto. That is, although the focus of the above embodiments is to prevent damage from being generated to an image apparatus due to displaying of a still screen for a long time during the playback of music, the present invention can be equally applied to a case where a still screen is required for a relatively long duration, as shown in the embodiment depicted in FIG. 4.

As described above, the present invention relates to a method of preventing damage from being generated to an image apparatus due to overheating caused by an unchanging screen when music is played back for a long time. As image apparatuses are combined and complex, MP3 music playback capability is provided as a basic specification. However, when music is played back for extended periods using an image apparatus with an expensive display, and the display is left unchanged, damage to the displays is inevitable. However, the present invention protects the expensive display mounted in the image apparatus during extended playback of music, while providing a user with information on the music being played back.

Furthermore, the present invention can be applied to all types of image apparatuses including PDPs with slots for memory cards, LCD digital TVs, and digital devices for DVD/CD (DVD players and recorders, DVD-VCR combos, HD type set top boxes with built-in DVD players and recorders, and all apparatuses supporting HDRs, MP3s, and WMAs), so that the image apparatus is protected during playback of music and information on the music being played back can be provided to a user.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A screen saving method of an image apparatus, comprising:
   displaying a list of music for playback;
   activating a first timer while playing an audio signal corresponding to a music item selected from the list;
   displaying a screen saving image including audio playback information when a duration of the activated first timer reaches a predetermined time t1;
   activating a second timer while displaying the screen saving image; and
   changing a position of the screen saving image when a duration of the activated second timer reaches a predetermined time t2.

2. The screen saving method according to claim 1, wherein the screen saving image is a still image.

3. The screen saving method according to claim 1, wherein a portion of the screen saving image changes according to a change in the audio playback information, and is displayed.

4. The screen saving method according to claim 1, wherein the audio playback information includes:
   at least one of storage media data for storing the audio signal, a total playback time and a current playback time of a current audio signal being played back, a method of playing back the audio signal, a state of sound, a total number of playable audio signals, an order of the current audio signal being played back, and titles of the audio signals.

5. The screen saving method according to claim 1, wherein a region of the screen saving image excluding the audio playback information is displayed in black.

6. The screen saving method according to claim 1, wherein the screen saving image is displayed in different ways according to genres of the music being played back.

7. The screen saving method according to claim 1, further comprising:
   resetting one of the first and second timers in response to a user action.

8. The screen saving method according to claim 7, wherein the user action includes at least one of stopping a currently played song to begin another song and restarting the currently played song.

9. An image apparatus, comprising:
   a display unit configured to display a list of music for playback and a screen saving image including audio playback information;
   a media playback unit configured to play back an audio signal corresponding to a music item selected from the list; and
   a control unit configured to
      activate a first timer while playing back the audio signal so as to control the display unit to display the screen saving image when an activated duration of the first timer reaches a predetermined time t1, and
   activate a second timer while displaying the screen saving image so as to control the display unit to change a position of the screen saving image when an activated duration of the second timer reaches a predetermined time t2.

10. The image apparatus according to claim 9, wherein the control unit changes a portion of the screen saving image according to a change in the audio playback information.

11. The image apparatus according to claim 9, wherein the audio playback information includes:
   at least one of storage media data for storing the audio signal, a total playback time and a current playback time of a current audio signal being played back, a method of playing back the audio signal, a state of sound, a total number of playable audio signals, an order of the current audio signal being played back and titles of the audio signals.

12. The image apparatus according to claim 9, wherein the control unit displays a region of the screen saving image excluding the audio playback information in black.

* * * * *